Feb. 17, 1925.　　　　　　　　　　　　　　　　　　　1,526,881
K. TJOSSEM
MANURE LOADER
Filed April 17, 1924　　　　4 Sheets-Sheet 1
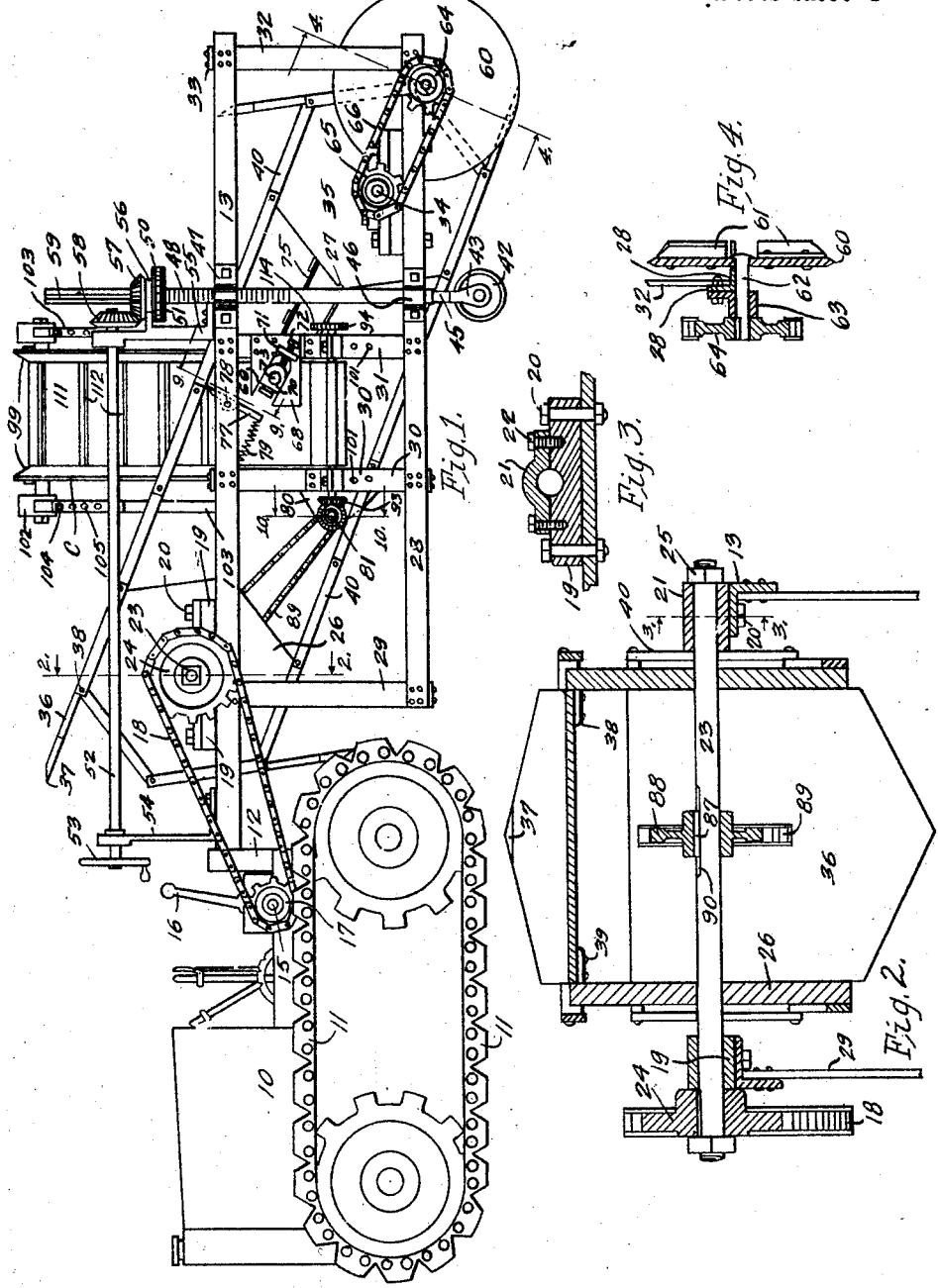
INVENTOR
Kinney Tjossem
BY
Bair & Freeman
ATTORNEYS
WITNESS

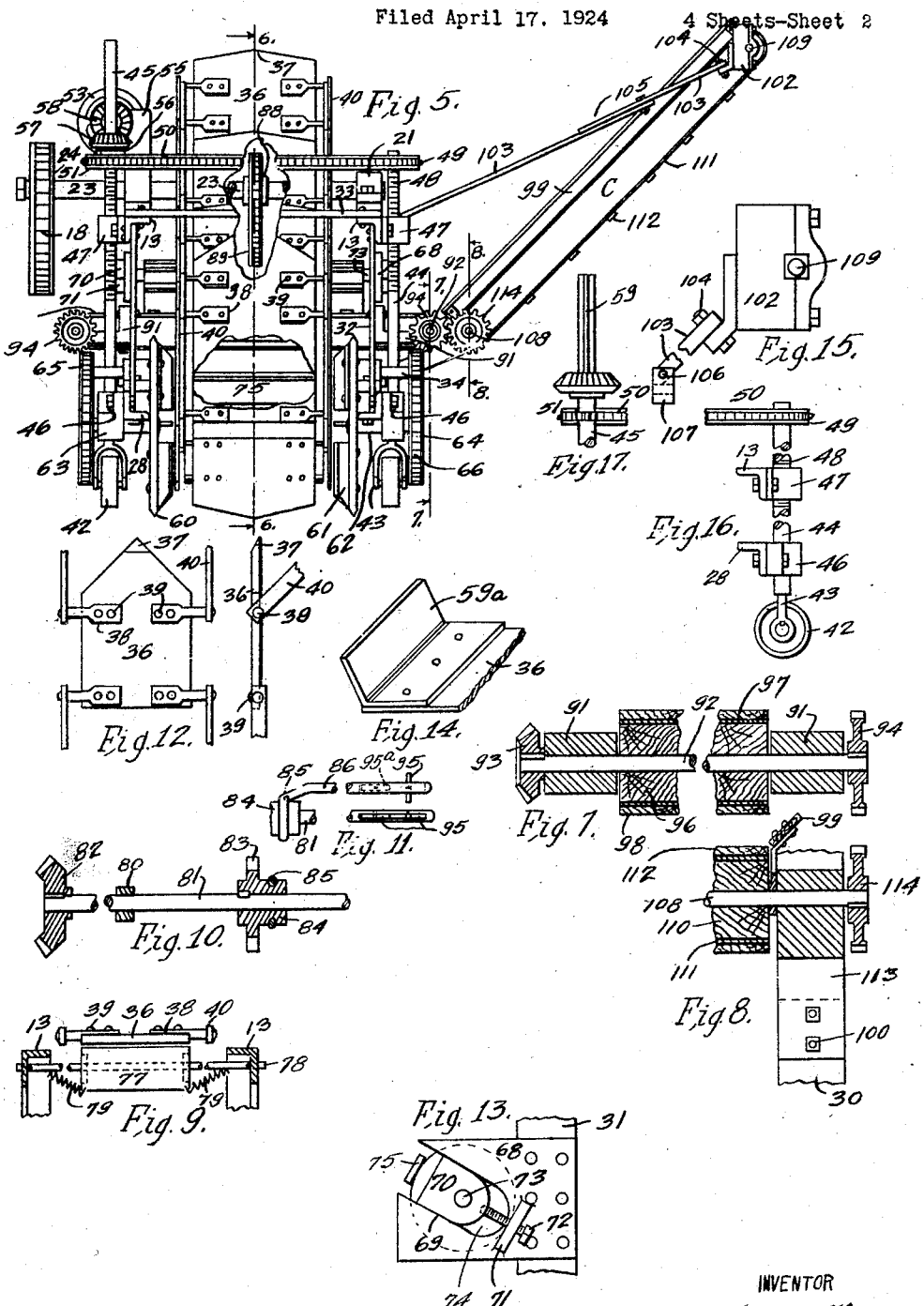

Feb. 17, 1925.  
K. TJOSSEM  
MANURE LOADER  
Filed April 17, 1924  
1,526,881  
4 Sheets-Sheet 3

INVENTOR  
Kinney Tjossem  
BY  
ATTORNEYs

WITNESS

Feb. 17. 1925.  K. TJOSSEM  1,526,881
MANURE LOADER
Filed April 17. 1924  4 Sheets-Sheet 4

WITNESS

INVENTOR
Kinney Tjossem
BY
Bair & Freeman
ATTORNEYS

Patented Feb. 17, 1925.

1,526,881

UNITED STATES PATENT OFFICE.

KINNEY TJOSSEM, OF PAULLINA, IOWA.

MANURE LOADER.

Application filed April 17, 1924. Serial No. 707,105.

*To all whom it may concern:*

Be it known that I, KINNEY TJOSSEM, a citizen of the United States, and a resident of Paullina, in the county of O'Brien and State of Iowa, have invented a certain new and useful Manure Loader, of which the following is a specification.

The object of my invention is to provide a manure loader of comparatively simple and inexpensive construction.

More particularly my invention relates to a manure loader adapted to be moved into a pile of manure or the like by backing the loader structure into the pile and controlling the same from a caterpillar secured to the loader structure.

Still a further object is to provide a pair of castor wheels for supporting the forward end of the loader structure, which wheels are capable of vertical adjustment from the tractor.

Still a further object is to provide a loader structure mounted upon a boom frame, which is pivotally connected to the tractor and capable of swinging movement relative to the tractor for permitting the entire loader structure to be raised or lowered as desired.

Still a further object is to provide a pair of rotating cutter blades on each side of the boom frame and on each side of the scoop conveyors for cutting a path into the pile of manure, so that the scoop conveyor will be able to back up and carry the manure with it, without a lot of loose ends of the straw from the manure being left in the pile, the revolving cutter blades cutting a clean slice out of the manure pile.

Still a further object is to provide a scoop conveyor adapted to remove the manure from the pile and deposit it upon a second conveyor, which in turn deposits the manure on a third conveyor arranged cross-wise of the machine for discharging the same into an elevating conveyor capable of being mounted on either side of the machine.

Still a further object is to so arrange the cross conveyor as to permit it to be operated in either direction for depositing the manure into an elevating conveyor arranged on either side of the machine.

Still a further object is to provide a spring actuated cleaner blade pivotally mounted on the boom frame of the loader structure and adapted to scrape the inner sides of the scoop conveyor.

Still a further object is to provide a clutch mechanism for permitting rotation to be imparted to the cross conveyor in either direction as desired.

Still a further object is to provide a bracket on each side of the boom frame to which the elevating conveyor may be secured, and at the same time to provide braces from the frame to the elevating conveyor for permitting the elevating conveyor to be raised or lowered as desired and locked in any of its adjusted positions.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of my loader structure connected to a tractor of the caterpillar type.

Figure 2 is a sectional view taken on the line 2—2 of Figure 1, showing the drive connection between the tractor and the loader structure.

Figure 3 is a detail, sectional view taken on the line 3—3 of Figure 2, showing the type of bearing structure used for the drive shafts.

Figure 4 is a detail, sectional view taken on the line 4—4 of Figure 1, showing the revolving cutter blades.

Figure 5 is a front elevation of my improved loader structure, parts being broken away in order to better illustrate the construction.

Figure 7 is a detail, sectional view taken on the line 7—7 of Figure 5, showing the drive gear and shaft for the operating of the cross conveyor.

Figure 8 is a detail, sectional view taken on the line 8—8 of Figure 5, showing the elevating conveyor drive shaft.

Figure 9 is a detail, sectional view taken on the line 9—9 of Figure 1, showing the cleaner blade for the scoop conveyor.

Figure 10 is a detail, sectional view taken on the line 10—10 of Figure 1, showing the driving shaft which drives the cross conveyor.

Figure 11 is a detail view of a clutch operating lever, which cooperates with the shaft shown in Figure 10. Both a plan and an end view is shown of the end of the clutch operating lever.

Figure 12 is a plan view of one of the scoops of the conveyor scoop and also an end view.

Figure 13 is a detail view of one of the adjustable bearings for the auxiliary conveyor.

Figure 14 is a perspective view of a portion of a scoop blade with a back piece secured thereto.

Figure 15 is an enlarged end view of the brace connection between the elevating conveyor frame and the boom frame.

Figure 16 is a detail view of one of the castor wheels, which is capable of vertical adjustment; and Figure 17 is a detail view of the other castor wheel shaft.

Figure 6:
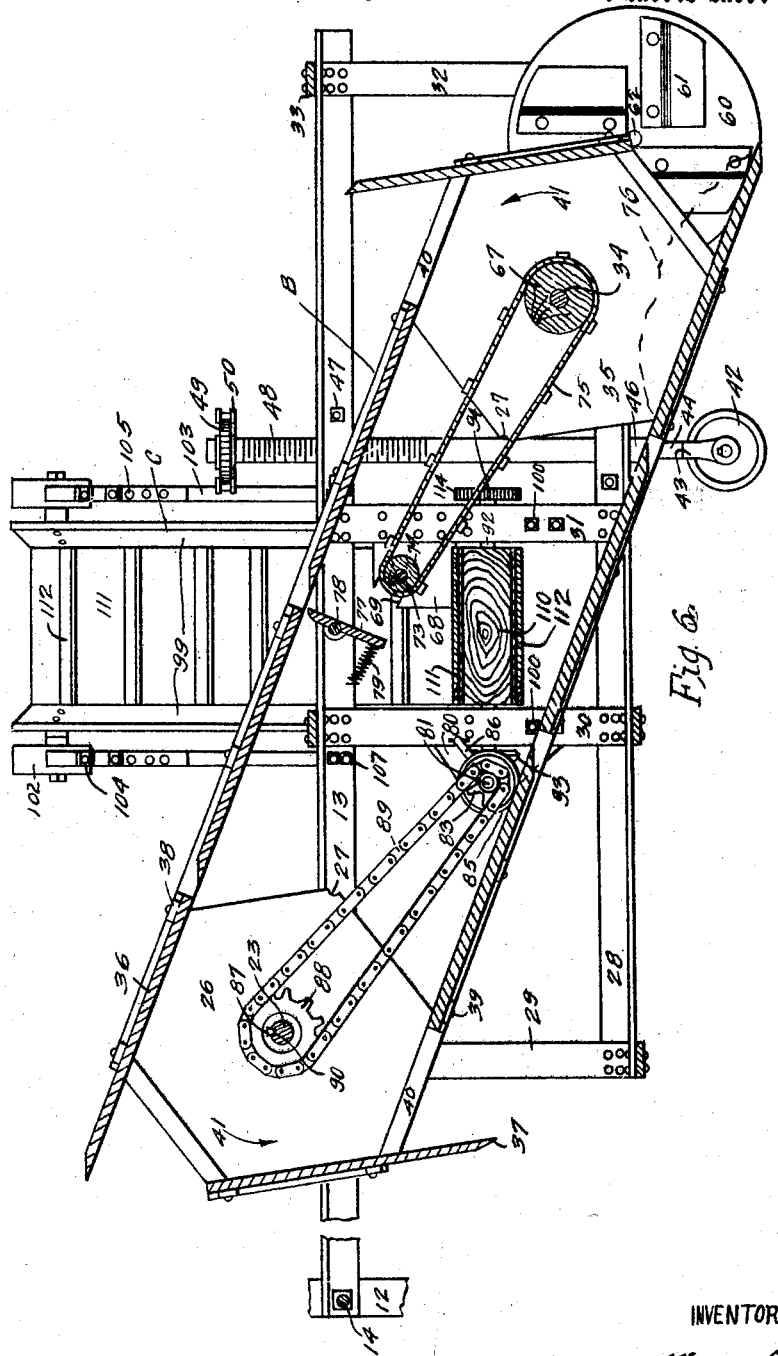
Figure 6 is a central, longitudinal, sectional view taken on the line 6—6 of Figure 5, showing the complete loader structure and frame therefor.
Figure 18:
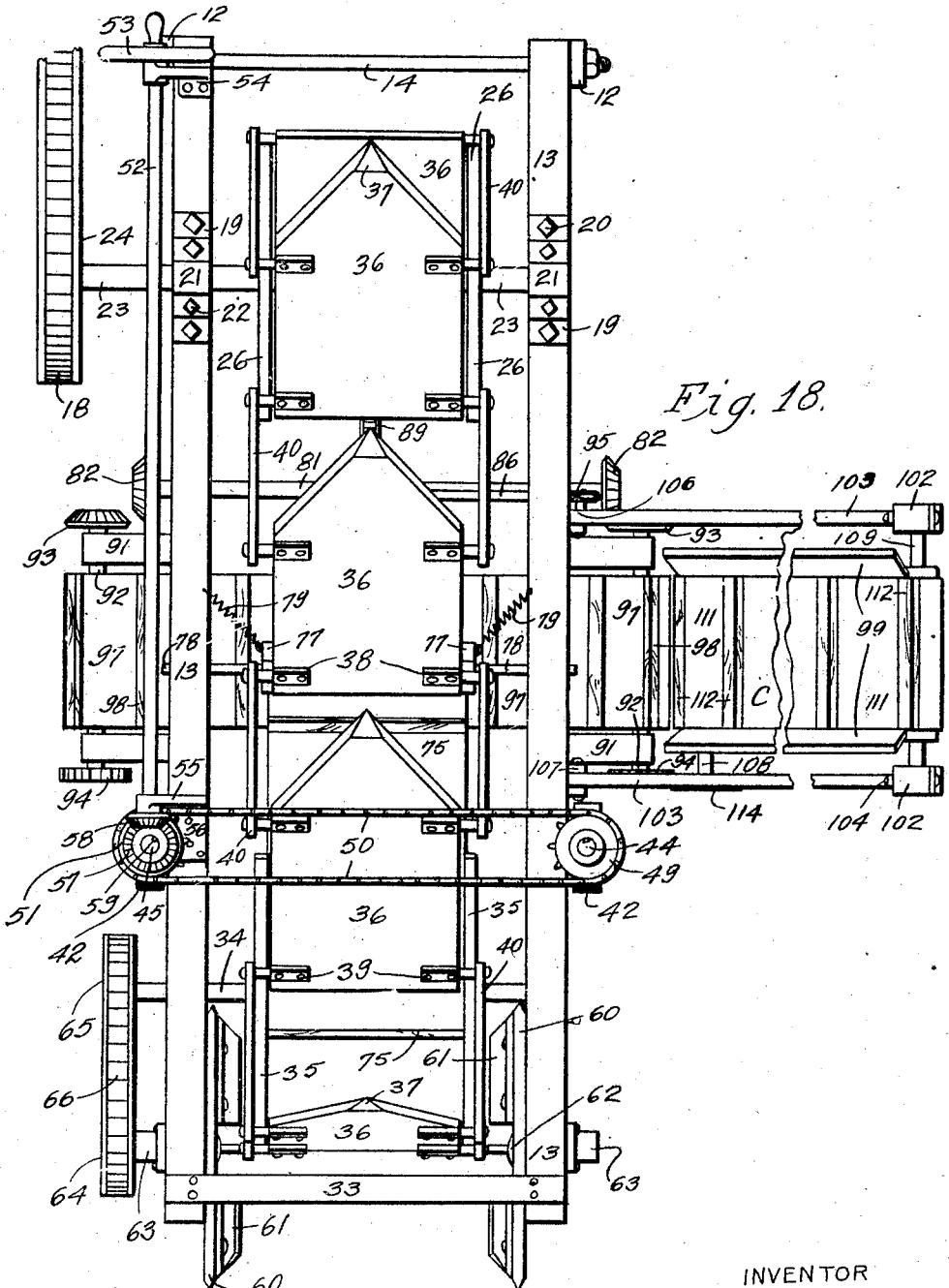
Figure 18 is a plan view of my loader structure which clearly shows the relation of the various elements.

In the accompanying drawings, I have used the reference numeral 10 to indicate generally a tractor provided with a caterpillar tread 11, which is of the ordinary type. There are two treads 11 provided, so that movement of the tractor 10 in a line other than straight can be accomplished by stopping one of the treads and operating the other, or vice versa as desired.

Mounted upon the tractor 10 near the rear end thereof adjacent the control mechanism of the tractor is an upright frame 12, which is pivotally connected to a boom frame 13 by means of a shaft 14, which serves as the pivot upon which the entire boom may swing relative to the tractor 10.

The tractor 10 has mounted upon it a shaft 15, which is operatively connected to the engine of the tractor 10 and is controlled by a control lever 16.

The shaft 15 projects out to one side of the tractor and has a sprocket 17 mounted thereon around which is extended a sprocket chain 18. The sprocket chain 18 is used for driving the entire loader structure, as will hereinafter be more fully set forth.

The boom frame 13 is preferably formed of angle iron pieces and consists of two spaced frames, which receive the loader mechanism therebetween.

Mounted upon the boom frame 13 on the spaced parts thereof are the bearing blocks 19. The bearing blocks 19 are bolted to the frame 13 by means of the bolts 20. A bearing cap 21 is secured to the bearing block 19 by the screws 22. The bearing cap 21 and the bearing block 19 are each provided with notches which register with each other for forming an opening, which serves as a bearing in which is journaled a drive shaft 23.

One end of the drive shaft 23 projects beyond the side of the boom frame 13 and has keyed thereon a sprocket gear 24 around which passes the chain 18.

From the construction of the parts just described, it will be seen that rotation of the sprocket gear 17 will impart rotation to the sprocket gear 24 and in turn to the shaft 23.

The shaft 23 may be provided with enlarged nuts 25 on its ends for retaining the shaft 23 in proper position or may be held in proper position by any suitable means.

Mounted upon the shaft 23 and spaced apart are the hexagon-shaped members 26. The hexagon-shaped members 26 are fixedly secured to the shaft 23. Each of the corners of the hexagon-shaped members 26 are formed with notches 27, which cooperate with a scoop conveyor, as will hereinafter be described.

The boom frame 13 is provided with a lower frame portion 28, which is formed of angle iron and is connected by a number of uprights 29, 30, 31 and 32.

The forward end of the boom frame has its two spaced sides connected together by a cross brace 33. Mounted in a bearing block 19 and cover plate 21 secured on the portion 28 of the boom frame 13 is a shaft 34. The shaft 34 has fixed to it a pair of spaced hexagon-shaped members 35, which are substantially in alignment with the members 26 on the shaft 23. The members 35 are formed with notches 27, the same as the members 26.

A scoop conveyor B travels around the members 26 and 35. The scoop conveyor B comprises a number of scoop blades 36 arranged with a pointed sharpened edge 37.

Secured to the underside of each of the scoop blades 36 are bolts 38, which have flattened surfaces for permitting them to be riveted to the scoop blades by means of the rivets 39. The projecting ends of the bolts 38 mounted on the adjacent scoop blades 36 are connected together by links 40, so that all the scoop blades form a complete scoop blade conveyor. The links 40 are spaced away from the outside edges of the scoop blades 36, so that the projected ends of the bolts 38 may be received in the notches 27 formed in the members 26 and 35.

The scoops are placed apart so that the forward bolt on one of them and the rear bolt on the other may be received in any two of the adjacent notches 27 in either of the members 26 or 35.

The bolts 38 on each scoop blade are also so positioned as to be received in any two adjacent notches 27. The members 26 and 34 are rotated in the direction indicated by the arrows 41.

The pointed end 37 of each of the scoop blades 36 is first to engage a pile of manure.

In order to support the forward end of the boom frame 13 and to adjust it vertically, so that the depth of the cut in the pile of manure can be varied, as desired, I provide castor wheels 42 on each side of the frame 13.

The castor wheels 42 are mounted between bifurcated arms 43, which are operatively connected to vertical shafts 44 and 45 respectively.

The shaft 44 has its lower end rotatably mounted in a bearing 46 secured to one part of the portion 28 of the frame 13, as clearly shown in Figure 16 of the drawings.

The arms 43, which receive the castor wheels 42 therein, are connected to the shafts 44 and 45 by means of a swivel connection, so as to permit the castor wheels 42 to rotate, as desired.

A bearing 47 is mounted on the upper portion on each side of the frame 13 and is formed with an interiorly screw-threaded opening (not shown). The shafts 44 and 45 are each provided with a screw-threaded portion 48, which is received in the screw-threaded opening in the bearing 47.

The upper end of the shaft 44 is provided with a sprocket wheel 49, which has a chain 50 extending therearound. The shaft 45 has fixed to it a sprocket wheel 51 around which the chain 50 passes.

From the construction of the parts just described, it will be seen that rotation of either of the shafts 44 or 45 will impart rotation to the other one.

Also from the construction of the parts just described, it will be seen that rotation of the shafts 44 and 45 will cause them to thread into the screw-threaded openings in the bearings 47, for either raising or lowering the entire boom frame 13. The raising and lowering of the boom frame 13 is operated from the tractor 10 by means of an operating shaft 52, which has a drive wheel 53 thereon. The end of the operating shaft 52 adjacent to the tractor 10 is supported in an upright bracket 54. A bracket 55 is mounted on one side of the boom frame 13 adjacent the shaft 45 and serves as a bearing for the forward end of the operating shaft 52. The bracket 55 is provided with an extension arm 56 through which extends the shaft 45.

Slidably but non-rotatably mounted upon the shaft 45 is a beveled gear 57. The beveled gear 57 rests upon the extension arm 56 of the bracket 55.

The bracket 55 has the extension arm 56 offset therefrom, so as to receive the shaft 45.

The end of the operating shaft 52 is provided with a beveled gear 58, which is in mesh with the beveled gear 57.

The shaft 45 is provided with a key-way 59, which coacts with a key mounted in the beveled gear 57, whereby the gear 57 is fixed to the shaft 55, in such a manner as to permit slidable movement thereof, but non-rotatable movement.

From the construction of the parts just described, it will be seen that rotation of the operating shaft 52 will impart rotation to the shaft 45, which in turn will impart rotation to the shaft 44, for causing the shafts 44 and 45 to be threaded in the bearings 47 for raising and lowering the boom frame 13, as desired.

In Figure 14 of the drawings, I have shown a back member 59ª, which can be used if desired on the scoop blades 36, when the material to be moved is loose, and a back on the scoop blade is required.

Mounted on each side of the boom frame 13 on the part 28 thereof is a cutter blade 60. The cutter blades 60 are each formed with in-turned cutting flanges 61, which are so arranged as to not only cut the pile of material, but to tend to throw the material inwardly, so as to be within the path of the conveyor scoops.

The blades 60 are mounted on shafts 62, which are journaled in bearings 63 fixed to the frame 28 of the boom frame 13.

A sprocket gear 64 is mounted on the outer end of each of the shafts 62.

The ends of the shaft 34 project out beyond the sides of the boom frame 13, and have mounted thereon sprocket gears 65, which are in substantial alignment with the gears 64 and are connected thereto by sprocket chains 66.

From the construction of the parts just described, it will be seen that rotation is imparted to the cutting blades 60 from the shaft 34. The scoop blades 36 will pick up and carry upon them the manure from a pile, and the cutting blades 60 will materially assist in getting the pile of manure in such shape as will permit of its being picked up by the scoop blades 36.

Mounted upon the shaft 34 between the adjacent inner faces of the members 35 is a roller 67, which is of substantial diameter. Brackets 68 are mounted on the uprights 31 and have notches 69 formed therein in which are mounted slidable bearings 70. The brackets 68 are formed with out-turned flanges 71, provided with interiorly screw-threaded opening for receiving adjusting screws 72.

The adjusting screws 72 have their ends projected into notches formed in the slidable bearings 70 as clearly shown in Figure 13 of the drawings. Journaled in the slidable bearings 70 is a shaft 73, having a roller 74 thereon. The roller 74 is of less diameter than the roller 67 on the shaft 34.

An auxiliary conveyor 75 of any suitable kind travels around the rollers 67 and 74. The adjustability of the bearings 70 makes it possible to vary the tension of the auxiliary conveyor 75, as necessary.

The auxiliary conveyor 75 is driven through the medium of the shaft 34 and travels in the same direction as does the scoop conveyor B in the direction indicated by the arrows 41.

As each scoop blade 36 engages some manure and has it resting thereon, as shown by the dotted lines 76 in Figure 6 of the drawings, and the scoop conveyor B travels, it will cause the manure to be dropped from the scoop blades onto the auxiliary conveyor 75, which delivers the manure to another conveyor as will hereinafter be described.

In order to thoroughly clean the inner surfaces of the scoop blades 36, I provide a cleaner blade 77 mounted on a shaft 78, which has its ends journaled in the boom frame 13. A pair of coil springs 79 tend to reain the cleaner blade 77 in position for permitting it to engage the inner surfaces of the scoop blades 36.

Should anything remain on the inner surfaces of the scoop blades 36, the yielding connection of the cleaner blade 77 will permit the blade to swing or give way rather than break, although in most cases, it will act as a positive means for cleaning the scoop blades 36.

The cleaner blade 77 is so positioned as to insure anything falling from the scoop blades 36 by the use of the cleaner blade 77 upon the auxiliary conveyor 75.

Mounted in a pair of bearings 80 secured to the uprights 30 of the frame 13 is a transverse shaft 81, which has beveled gears 82 fixed to each end thereof.

The shaft 81 is slidably mounted in the bearings 80 and has fixed to it a sprocket gear 83, which is formed with an enlarged hub 84. The hub 84 has an annular groove therein for receiving the bifurcated arm 85 of a control lever 86.

Keyed to the shaft 23 by means of a key 87 is a sprocket gear 88, which is operatively connected to the sprocket gear 83 by means of the sprocket chain 89. The key 87 is capable of sliding movement within the key-way 90 of the shaft 23. The purpose of the slight sliding movement, which the sprocket gear 88 has on the shaft 23 will hereinafter be more fully explained.

Fixed to each of the uprights 30 and 31 on each side of the boom frame 13 and extending outwardly therefrom are the brackets 91.

Each pair of brackets on each side of the frame 13 have mounted therein shafts 92. The ends of the shafts 92 project beyond the brackets 91 and have mounted on one end a beveled gear 93 and on the other end a spur gear 94.

The beveled gears 82 on the shaft 81 may be slid into engagement with one of the beveled gears 93 on one of the shafts 92. That is, when the shaft 81 is slid longitudinally within the bearings 80, then the beveled gear 93 on the left-hand side of the machine will be engaged, and when the shaft 81 is slid in an opposite direction, then the beveled gear 93 on the right-hand side of the machine will be engaged.

In order to lock the shaft 81 in position where it engages one of the beveled gears 93, I have the lever 86 extending through an opening in one of the uprights 30, and provide a pair of pins 95 on the lever 86. The pins 95 can be moved to position 95$^a$ shown in dotted lines in Figure 11, and will, when in this position, be permitted to pass through the opening formed in the upright 30.

Either one of the two pins 95 may be arranged to move to position substantially at right angles to the lever 86, and when in this position will retain the lever 86 and the sprocket wheel 83, together with the shaft 81, in either of their positions.

When the gear 83, together with the shaft 81 is moved, it will cause the sprocket gear 88 on the shaft 23 to also slide, due to the sprocket chain connection 89.

From the construction of the parts just described, it will be seen that the shaft 92 on each side of the machine may be operated from the single shaft 81 by simply sliding the shaft 81 into and out of engagement with the gears 93 on the shafts 92.

Each of the shafts 92 has a roller 96 mounted thereon, which rollers in turn have a conveyor belt 97 passing therearound. The conveyor belt 97 may be provided with suitable cross slats 98.

The conveyor just mentioned may be properly termed the cross conveyor, because it extends from one side of the machine to the other side of the machine and travels in a direction substantially at right angles from the line of travel of the auxiliary conveyor 75 on the scoop conveyor B.

The upper end of the auxiliary conveyor 75 is so positioned that it is above the cross conveyor 97 so that the material discharged at the upper end of the auxiliary conveyor 75 will be deposited upon the cross conveyor 97.

It will be noted that the cross conveyor will carry the material, depositing to either side of the machine, depending upon which particular gear 93 is in mesh with the particular beveled gear 82 on the shaft 81.

In order to carry the manure or other material up to the wagon or other suitable vehicle, it is necessary to provide an elevating device.

My elevating conveyor referred to by the reference character C consists of an outside frame. The frame C may be provided with inclined sides 99 for retaining the material upon the elevating conveyor. The lower ends of the frame C are bolted to the uprights 30 and 31 by means of the bolts 100.

One elevating conveyor frame is used for carrying the material on either side of the machine, and I have so arranged my elevating conveyor that it can be removed from one side and connected to the opposite side of the machine.

The bolts 100 pass through openings 101 in the uprights 30 and 31 and the openings 101 are formed on each side of the machine for permitting the conveyor frame C to be secured thereto.

The upper end of the conveyor frame C has fixed to it a block 102, which is connected to a pair of straps 103 by means of the bolts 104. The straps 103 are arranged in two parts and are connected together by bolts 105, and are capable of being adjusted for changing the angle of inclination of the conveyor frame C.

The strap irons 103 have their free ends connected to the frame 13 in any suitable manner, although in Figure 15, I have shown a pin 106 extending through a block 107, which pin is connected to the straps 103 for permitting pivotal movement of them, when it is desired to change the position of the elevating frame C. The dotted lines in the block 107 shown in Figure 15, are used for extending a bolt therethrough, whereby the block 107 may be connected to the frame 13.

A lower shaft 108 is mounted in the conveyor frame C at its lower end, and an upper shaft 109 is mounted in the conveyor frame C at its upper end. A roller 110 is mounted on each of the shafts 108 and 109 and there is extended therearound a conveyor belt 111, which is provided with a number of engaging slats 112. The entire belt 111 and the slats 112 may properly be termed the elevating conveyor.

In this connection, it may be mentioned that the frame C is made independent of the bracket 113, which is the part that bolts to the uprights 30 and 31, so as to permit movement of the frame C relative to the entire machine.

The frame C is really pivoted on the shaft 108 between the roller 110 and the bracket 113, as clearly illustrated in Figure 8. The shaft 108 is provided with a spur gear 114 on each of its ends, which is designed to mesh with spur gears 94 on one end of each of the shafts 92. The spur gear 114 is shown in mesh with the gear 94 in Figure 5 of the drawings.

From the construction of the parts just described, it will be seen that when the shaft 92 on the right-hand side of the machine is operated, it will operate the conveyor, which in Figure 5, is shown on the right-hand side of the machine.

When it is desired to change the position of the elevating conveyor, it is necessary to remove the brackets 113 and secure them to the opposite side of the machine carrying of course with them the entire elevating conveyor.

The gear 114, which is on the opposite side of the shaft 108, from that shown in Figure 5 of the drawings, will then mesh with the spur gear 94 on the other shaft 92, which is the shaft mounted on the left-hand side of the machine.

In order that the structure may be clearly understood, it will be noted that the shaft 108 is provided with two spur gears 114, which are positioned on the left-hand and right-hand sides of the frame C, so that one of the spur gears 114 may be made to mesh with either of the gears 94 or either of the shafts 92, depending on what side of the machine the entire elevating conveyor is mounted.

From the construction of the parts just described, it will be seen that after the manure or other material is carried to the cross conveyor 97, it can be deposited onto the elevating conveyor and from there discharged into a wagon or other suitable vehicle.

It will be noted that the cross conveyor may be operated for the discharging of the manure deposited thereon either on the left side of the machine or on the right hand side of the machine, as desired.

One of the advantages of my machine resides in the fact that I am able to back into a pile of manure and cut a clean slice therefrom by means of the cutting blades 60 and then gather the manure up by means of the scoop blades 36, and finally deposit the manure upon an auxiliary conveyor 75, and upon a cross conveyor 97, and finally into the elevating conveyor from where it is discharged into a wagon or the like.

In the practical operation of my manure loader, I am able to raise and lower the boom frame, due to its pivotal connection with the tractor from the tractor itself by means of the operating shaft 52.

Some changes may be made in the construction, arrangement and combination of the various parts of my manure loader, without departing from the essential features and purposes of my invention, and it is my intention to cover by my claims, any modified forms of structure or use of mechanical equivalents, which may be reasonably included within their scope.

I claim as my invention:

1. A manure loader in combination with a tractor, comprising a boom frame pivotally connected to the tractor and capable of having its free end vertically adjusted, a scoop conveyor mounted in the boom frame and operatively connected to the driving mechanism of the tractor, and a cross conveyor mounted on the boom frame and arranged within the scoop conveyor and adapted to have deposited thereon the manure gathered by said scoop conveyor, said cross conveyor being driven from the drive shaft of the scoop conveyor.

2. A manure loader in combination with a tractor comprising a boom frame pivotally connected to the tractor and capable of having its free end vertically adjusted, a scoop conveyor mounted in the boom frame and operatively connected to the driving mechanism of the tractor, a cross conveyor mounted on the boom frame and arranged within the scoop conveyor and adapted to have deposited thereon the manure gathered by said scoop conveyor, said cross conveyor being driven from the drive shaft of the scoop conveyor, and a pair of cutting blades mounted on said frame and on each side of said scoop conveyor for cutting a path in the pile of manure to be loaded.

3. A manure loader in combination with a tractor comprising a boom frame pivotally connected to the tractor and capable of having its free end vertically adjusted, a scoop conveyor mounted in the boom frame and operatively connected to the driving mechanism of the tractor, a cross conveyor mounted on the boom frame and arranged within the scoop conveyor and adapted to have deposited thereon the manure gathered by said scoop conveyor, said cross conveyor being driven from the drive shaft of the scoop conveyor, and a pair of cutting blades mounted on said frame and on each side of said scoop conveyor for cutting a path in the pile of manure to be loaded, said cutting blades having inturned flanges thereon for throwing the manure engaged into the path of the scoop conveyor.

4. A manure loader in combination with a tractor comprising a boom frame pivotally connected to the tractor and capable of having its free end vertically adjusted, a scoop conveyor mounted in the boom frame and operatively connected to the driving mechanism of the tractor, a cross conveyor mounted on the boom frame and arranged within the scoop conveyor and adapted to have deposited thereon the manure gathered by said scoop conveyor, said cross conveyor being driven from the drive shaft of the scoop conveyor, and a pair of cutting blades mounted on said frame and on each side of said scoop conveyor for cutting a path in the pile of manure to be loaded, said cutting blades having inturned flanges thereon for throwing the manure engaged into the path of the scoop conveyor, and means for operatively connecting said cutting blades with the scoop conveyor for imparting rotary movement to the cutting blades.

5. A manure loader in combination with a tractor comprising a boom frame pivotally connected to the tractor and capable of having its free end vertically adjusted, a scoop conveyor mounted in the boom frame and operatively connected to the driving mechanism of the tractor, a cross conveyor mounted on the boom frame and arranged within the scoop conveyor and adapted to have deposited thereon the manure gathered by said scoop conveyor, said cross conveyor being driven from the drive shaft of the scoop conveyor, and an elevating conveyor mounted on one side of the frame and capable of being adjusted to various inclined positions.

6. A manure loader in combination with a tractor comprising a boom frame pivotally connected to the tractor and capable of having its free end vertically adjusted, a scoop conveyor mounted in the boom frame and operatively connected to the driving mechanism of the tractor, a cross conveyor mounted on the boom frame and arranged within the scoop conveyor and adapted to have deposited thereon the manure gathered by said scoop conveyor, said cross conveyor being driven from the drive shaft of the scoop conveyor, and an elevating conveyor mounted on one side of the frame and capable of being adjusted to various inclined positions, said elevating conveyor being operatively driven from said cross conveyor and adapted to receive the manure discharged from the cross conveyor for the purposes of elevating the same.

7. A manure loader in combination with a tractor comprising a boom frame pivotally connected to the tractor and capable of having its free end vertically adjusted, a scoop conveyor mounted in the boom frame and operatively connected to the driving mechanism of the tractor, a cross conveyor mounted on the boom frame and arranged within the scoop conveyor and adapted to have deposited thereon the manure gathered by said scoop conveyor, means for operatively connecting the cross conveyor to the scoop conveyor for driving the cross conveyor, said last means including a clutch mechanism whereby the direction of movement of the cross conveyor may be changed as and for the purposes stated.

8. A manure loader in combination with a tractor comprising a boom frame pivotally connected to the tractor and capable of having its free end vertically adjusted, a scoop conveyor mounted in the boom frame and operatively connected to the driving mechanism of the tractor, a cross conveyor mounted on the boom frame and arranged within the scoop conveyor, an auxiliary conveyor mounted on said boom frame and arranged within the scoop conveyor, said auxiliary conveyor receiving the manure deposited from the scoop conveyor and discharging it on to said cross conveyor as and for the purposes stated.

9. A manure loader in combination with a tractor, comprising a boom frame pivotally connected to the tractor at one end, castor wheels mounted on the other end of said boom frame, means for manually adjusting said castor wheels vertically for elevating or lowering the forward end of said boom frame and a scoop conveyor mounted on said boom frame and operatively driven from the driving mechanism of the tractor, said scoop conveyors comprising a plurality of flat blades having their forward ends inclined so as to be pointed.

10. A manure loader in combination with a tractor comprising a boom frame pivotally connected to the tractor at one end, castor wheels mounted on the other end of said boom frame, means for manually adjusting said castor wheels vertically for elevating or lowering the forward end of said boom frame and a scoop conveyor mounted on said boom frame and operatively driven from the driving mechanism of the tractor, said scoop conveyor comprising a plurality of flat blades having their forward ends inclined so as to be pointed, and a cleaner blade mounted on said boom frame for engaging the inner surface of the scoop blades of the scoop conveyor.

11. A manure loader in combination with a tractor, comprising a boom frame pivotally connected to the tractor at one end, castor wheels mounted on the other end of said boom frame, means for manually adjusting said castor wheels vertically for elevating or lowering the forward end of said boom frame and a scoop conveyor mounted on said boom frame and operatively driven from the driving mechanism of the tractor, said scoop conveyors comprising a plurality of flat blades having their forward ends inclined so as to be pointed and a yieldingly mounted cleaner blade mounted on said boom frame for engaging the inner surface of the scoop blades of the scoop conveyor.

Des Moines, Iowa, March 27, 1924.

KINNEY TJOSSEM.